Dec. 4, 1928.
W. WEILER
1,694,296
FREQUENCY CHANGER APPARATUS
Filed April 16, 1927
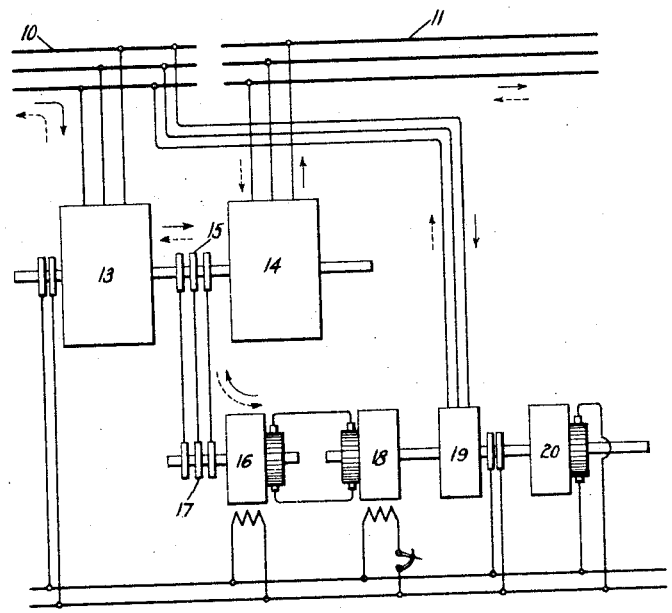
Inventor
Wilhelm Weiler
by *Alexander F. [signature]*
His Attorney Patented Dec. 4, 1928.

1,694,296

UNITED STATES PATENT OFFICE.

WILHELM WEILER, OF NIEDERSCHONHAUSEN, BERLIN, GERMANY, ASSIGNOR TO GENERAL ELECTRIC COMPANY, A CORPORATION OF NEW YORK.

FREQUENCY-CHANGER APPARATUS.

Application filed April 16, 1927, Serial No. 184,215, and in Germany May 15, 1926.

My invention relates to frequency changers for transmitting power between different alternating current systems in which one of the machines of the set is of the asynchronous type and is provided with dynamo-electric regulating apparatus connected in its secondary circuit for controlling the load. In such an installation where the induction machine operates below its synchronous speed, power is given out or absorbed by the induction motor secondary depending upon whether it operates as a motor or as a generator. Heretofore this regulating power has been transferred back or taken from the line to which the primary winding of the induction machine is connected and was utilized solely for the regulation of the induction machine.

In accordance with my invention the power used for load regulation is transferred from one of the two power systems to the other through the induction machine in the same direction as power is transferred through the main set itself. By this arrangement the capacity of the set may be reduced in proportion to the maximum power used in regulation.

The features of my invention which are believed to be novel and patentable will be pointed out in the claims appended hereto. For a better understanding of my invention, reference is made in the following description to the accompanying drawing which illustrates one arrangement of the apparatus and connections for carrying out my invention.

In the drawing, 10 and 11 represent two different distribution systems which may be of the same or different frequencies which frequencies may vary somewhat with respect to each other. Between these distribution systems is connected a frequency changer set illustrated as comprising a synchronous machine 13 and an induction machine 14 mechanically connected together. The induction machine is of the wound secondary type and has a pole number which requires it to operate below its synchronous speed. The secondary is brought out to slip rings 15 and connected with dynamo-electric load regulating apparatus which is driven independently of the main set. The load regulating apparatus here illustrated comprises a synchronous converter 16 having its alternating current slip rings 17 connected to the induction motor secondary and having its direct current brushes electrically connected to a direct current machine 18. The machine 18 is connected with a synchronous machine 19 which also drives a direct current exciter 20 for supplying direct current excitation to the various machines, as required. No particular type of dynamo-electric load regulating apparatus is required. For example, I might employ the load regulating apparatus represented in United States Patent 1,593,400, Gilt, or that represented in United States Patent 1,528,773, Kozisek, in which power factor control is included. However, it is essential to my invention that the machine of this regulating apparatus which transfers the load regulating power to and from the transmission line shall be connected to that transmission line other than the one to which the regulated induction machine is connected. In the apparatus represented it is essential to my invention that the synchronous machine 19 transfer the power used in regulation to and from the transmission line 10 instead of to and from the line 11, as has been done heretofore. Accordingly, the synchronous machine 19 is connected to the transmission line 10.

In transferring power from line 10 to line 11 the induction machine 14 operates as a generator below synchronous speed and it is therefore necessary for the auxiliary load regulating apparatus to supply electric energy to its secondary. Energy flows from line 10 to line 11 through the main set itself and through the load regulating apparatus and the induction machine, as represented by the full line arrows. In transferring power from line 11 to line 10, machine 14 operates as a motor below synchronism and consequently its secondary gives out power to the load regulating apparatus. Power flows from line 11 to line 10 through the main set itself and also through the induction machine and load regulating apparatus as indicated by the dotted line arrows. The power thus used in regulation is transferred from one system to the other in the desired direction instead of merely circulating through the induction machine. Accordingly, the main machines of the set may be reduced in size and capacity by an amount corresponding to the maximum power used in regulation which of course occurs at the maximum load. For example, assume it is desired to provide frequency changer apparatus between the two systems having a capacity of 1000 kilowatts and that 160 kilowatts are required for load regulation of the induction machine. Heretofore both the synchronous machine 13 and the induction machine 14 would be designed for 1000 k. w. motor generator action. In accordance with my invention these machines need to be designed for only 840 k. w. motor generator action because at maximum load 160 kilowatts flow through the load regulating apparatus in parallel with machine 13. These 160 kilowatts flow through the induction machine by transformer action between the primary and secondary windings, the same as it did in prior installations, but in doing so, it flows from one system to the other instead of merely circulating through load regulating apparatus and an induction machine connected to the same system.

Heretofore it was always considered desirable from the standpoint of economy to have the induction machine operate close to its synchronous speed in order to reduce the size and capacity of the load regulating apparatus which performed no other function than that of regulation. However it is seen that where my invention is employed this consideration is no longer important because the load regulating apparatus itself serves to transfer power from one system to the other in performing its regulating function and as its capacity is increased the capacity of the main set may be reduced.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. In combination, two alternating current systems, a frequency changer set connected between said systems comprising two mechanically connected alternating current dynamo-electric machines respectively electrically connected to said systems, one of said machines being of the form wound asynchronous type arranged to operate below synchronism, regulating apparatus for controlling the power supplied to or given out from the secondary of said asynchronous machine to control the direction and magnitude of the load transferred through said set, said regulating apparatus having a power connection to that distribution system other than the one connected to said asynchronous machine so that the power used in such load regulation is transferred from one system to the other through said regulating apparatus and asynchronous machine in the same direction as load is transferred through said set.

2. In combination with two alternating current systems, frequency changer apparatus connected between said systems comprising mechanically connected alternating current dynamo-electric machines respectively electrically connected to said systems, at least one of said machines being of the form wound secondary asynchronous type arranged to operate below synchronism and having dynamo electric load regulating apparatus associated with its secondary, said load regulating apparatus being mechanically independent of said mechanically connected alternating current dynamo-electric machines, said dynamo-electric load regulating apparatus being electrically connected to transfer the power used in load regulation between the secondary of the asynchronous machine and that distribution system other than the one to which the regulated asynchronous machine is connected.

3. In combination, two alternating current distribution systems, frequency changer apparatus connected between said systems comprising a synchronous machine connected to one system and an asynchronous machine connected to the other system, said machines being mechanically connected together and having such pole numbers that the asynchronous machine operates below synchronism, said asynchronous machine being of the form wound secondary type, dynamo-electric load regulating apparatus for said asynchronous machine driven independently of said mechanically connected alternating current machines, said load regulating apparatus being electrically connected to transfer the power used in load regulation between the secondary of said asynchronous machine and the distribution system to which said synchronous machine is connected.

In witness whereof, I have hereunto set my hand this 26th day of March, 1927.

WILHELM WEILER.